United States Patent

Yang et al.

[11] Patent Number: 6,030,671
[45] Date of Patent: Feb. 29, 2000

[54] LOW EMISSIVITY WINDOW FILMS

[75] Inventors: Peter Yong Nian Yang; Sepideh Yadollahi, both of San Diego, Calif.

[73] Assignee: MSC Specialty Films, Inc., San Diego, Calif.

[21] Appl. No.: 09/005,293

[22] Filed: Jan. 9, 1998

[51] Int. Cl.[7] ...................................................... E06B 3/24
[52] U.S. Cl. .............................. 428/34; 428/46; 428/212; 428/428; 428/432; 428/434; 428/450; 428/458; 428/457; 428/472; 428/624; 428/699; 428/701; 428/702; 428/913; 359/354; 359/360
[58] Field of Search .................................. 428/434, 469, 428/626, 624, 34, 457, 212, 472, 699, 701, 702, 913, 450, 441, 458, 428, 432, 46; 359/580, 354, 360, 585

[56] References Cited

U.S. PATENT DOCUMENTS

| | | | |
|---|---|---|---|
| 4,710,426 | 12/1987 | Stephens | 428/336 |
| 4,842,893 | 6/1989 | Yializis et al. | 427/44 |
| 5,464,710 | 11/1995 | Yang | 430/1 |
| 5,614,259 | 3/1997 | Yang et al. | 427/255.1 |

OTHER PUBLICATIONS

Film illustrated in and described in connection with Fig. 1 of this application (Minnesota Mining & Manufactoring Co.

*Primary Examiner*—Deborah Jones
*Assistant Examiner*—Abraham Bahta
*Attorney, Agent, or Firm*—Juetiner Pyle & PionteK

[57] ABSTRACT

A solar control window film having low emissivity minimizes the transfer of thermal energy through window glass by thermal radiation between a temperature controlled interior environment and a uncontrolled exterior environment. The film is comprised of a transparent flexible polymeric substrate bearing various transparent thin film layers of coating materials, including a highly reflective metal. The film is devoid of laminations and laminating adhesives and provides high visual light transmission of up to 50% or more while maintaining a very low emissivity of 0.30 or less. The film is especially suited for retrofitting existing plain glass windows to convert the same to solar control windows.

14 Claims, 3 Drawing Sheets

6,030,671

LOW EMISSIVITY WINDOW FILMS

FIELD OF THE INVENTION

The present invention relates to solar control window films having low emissivity for minimizing transfer of thermal energy by radiation through windows between a controlled environment, such as a temperature controlled room or office, and a different or uncontrolled environment, for example the outdoors.

BACKGROUND

Windows having low emissivity (low e) find particular use in cold climates for preserving the heat in homes, offices, automobiles and other heated environments and for mitigating escape of warm room air to the cold exterior via the window glass. Low e windows are also useful in hot climates for rejecting thermal energy radiation from the exterior and for minimizing thermal energy transfer via the windows between the interior and the exterior, thereby to maintain a cool interior.

Window glass itself may be treated and/or coated to provide low emissivity characteristics. However, treated glass does not provide adequate protection against ultraviolet (UV) radiation or adequate mechanical protection for the metal or other material coated on glass. Also, if the treated glass becomes corroded or is broken or otherwise damaged, it is very difficult to match the appearance and/or color of a new or replacement glass with the appearance and color of the original glass.

A more practical approach is provided by flexible polymeric films that can be adhered to window glass. Such films are in widespread use and provide a variety of solar control functions. The films are easy to apply, can conveniently be removed and replaced, and can readily be made to duplicate the color and appearance of the film and/or film covered glass that is being replaced. Also, flexible films facilitate retrofitting of existing clear glass window panes to impart solar control functions to the same.

The majority of solar control films are made by metalizing a polymeric substrate film, usually poly(ethylene terephthalate) (PET), and then laminating a second film of PET onto the metalized surface of the substrate film. This results in a product having high emissivity, e.g., an emissivity in the order of about 0.7.

At the time of this writing there is, in the commercial market, one polymeric "winter" film product having low emissivity, specifically an emissivity of about 0.35. However, in order to attain such low e, the visible light transmission (VLT) of the film must be reduced to about 20%. Also, the film has little resistance to scratching and mechanical damage and must be handled, installed and cleaned with extreme care.

As shown in the accompanying FIG. 1, the low emissivity commercial product is comprised of a transparent flexible polymeric substrate bearing a transparent but relatively thick and dense layer of aluminum and a sheet of oriented polypropylene (OPP) that is laminated to the metalized surface of the substrate. The OPP has relatively low absorption in the thermal radiation range and the aluminum is sufficiently reflective to long wavelength infrared radiation (IR) that the film has low e. However, the OPP sheet is not free of absorption, and the laminating adhesive used to laminate the OPP sheet to the metalized substrate is also absorptive to thermal radiation. Consequently, the aluminum layer must be made dense and thick in order to hold the emissivity of the composite film to a value as low as 0.35, at which value VLT is no greater than about 20%. Also, the OPP has little if any resistance to scratching or mechanical damage. Any attempt to increase either scratch resistance or VLT results in a sharp increase in the product's emissivity, and a diminution in its ability to serve its intended function.

There is, therefore, a demand in the industry for window films having lower emissivity, greater visible light transmittance, and greater resistance to scratching and mechanical damage. Such films are especially desired for retrofitting of clear window panes.

SUMMARY OF THE INVENTION

It is a primary object of the present invention to provide solar control window films having low emissivity and high visible light transmittance.

Another object of the invention is to provide low e window films having significantly improved resistance to scratching and mechanical damage.

A further object of the invention is to provide low e window films that are highly durable to weathering and ultraviolet radiation.

Yet another object of the invention is to provide low e window films containing UV blockers capable of blocking UV transmission through the film thereby to protect furnishings and other objects within a room from ultraviolet damage.

A still further object of the invention is to provide low e window films that are readily and economically affixed to existing window panes to retrofit ordinary glass into a window having low emissivity for preserving heat in the winter and rejecting heat in the summer.

In accordance with the invention, a thin film layer of a reflective metal is deposited onto a transparent, flexible polymeric substrate, a thin film protective layer is deposited onto the metalized surface of the substrate, and a thin film of scratch and wear resistant hard coat material is coated over or deposited onto the protective film.

The reflective metal may be aluminum, but is preferably silver, gold, copper and/or alloys or combinations of the same. The metal is deposited at a thickness to provide a high VLT, preferably up to about 50% or more, and very low emissivity, preferably 0.10 or less.

The layer of protective material may comprise a UV stable polyester resin based primer or prime coat for imparting corrosion resistance and weatherability to the reflective metal, and is applied in a sufficiently thin film form as not to excessively increase emissivity.

Additionally, the reflective metal may be protected from deterioration caused by diffusion, migration and oxygen induced corrosion by means of a very thin film of metal or metal alloy providing excellent oxidation and corrosion resistance, without excessively increasing emissivity.

The scratch resistant hard coat comprises the external or exposed surface of the composite film and is preferably comprised of an acrylate having high chemical resistance and high scratch resistance.

The invention thereby eliminates the OPP film and the laminating adhesive of the prior art and provides a greatly improved window film product having very low emissivity, e.g., 0.30 or less, and very high visible light transmission, e.g., up to 50% and more.

The performance of the low e films of the present invention is further improved by applying a thin film coating of material of high optical index on one or the other or both sides of the reflective metal film for inducing visible light transmittance. At an emissivity of 0.30, the VLT can reach 65% and higher.

Further, the invention provides a flexible film of low emissivity that is highly resistant to scratching and mechanical damage and can therefore be utilized for retrofit applications with great facility.

These and other objects and advantages of the invention will become apparent from the following detailed description, as considered in conjunction with the accompanying drawings.

DETAILED DESCRIPTION OF THE PRIOR ART

Figure 1:
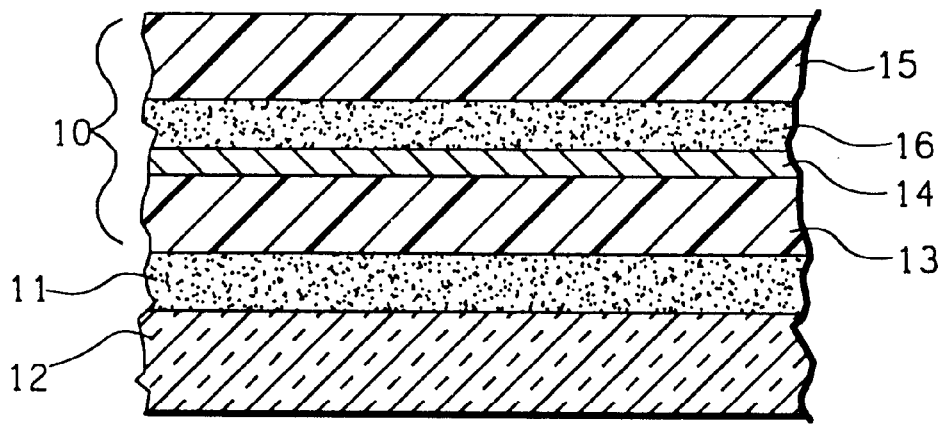
FIG. 1 is a schematic illustration, on a greatly magnified scale, of the commercially available, prior art low e window film.

FIG. 1 illustrates schematically a prior art solar control film 10 having low emissivity. As is conventional in the art, the film 10 is adhered by a layer 11 of pressure sensitive adhesive to the interior surface of a glass window, automotive windshield or other transparent member 12. The solar film is comprised of a flexible polymeric substrate 13, preferably Poly(ethylene terephthalate) (PET), bearing a film or layer 14 of aluminum, and a protective sheet 15 of oriented polypropylene (OPP) laminated to the metalized surface of the substrate by an intervening layer of laminating adhesive 16.

The solar film 10 together with the pressure sensitive adhesive 11 and a protective release sheet (not shown) is conventionally sold in sheet or roll form to professional installers for subsequent installation on the interior surface of commercial and residential windows, automotive windows, and the like, wherever it is desired to maintain an indoor or interior temperature without excessive transfer of thermal energy through the window.

The aluminum layer 14 and the OPP sheet 15 together permit fabrication of a film of low emissivity (low e), e.g., 0.35, but the sheet 15 is highly susceptible to scratching and must be handled, installed and cleaned with great care. More importantly, the OPP sheet 15 and the laminating adhesive 16 required to affix the OPP sheet to the metalized surface of the substrate 13 are strongly absorptive in the far infrared (FIR), and have a high emissivity at operative thickness. To compensate for the factors contributing to high emissivity, the aluminum layer must be made progressively thicker in order to lower the emissivity to an acceptable level. This in turn causes a decrease in the visible light transmittance (VLT) of the aluminum layer and a balance must be struck between these competing factors. In the commercial film, in order to provide an emissivity at the 0.35 level, the aluminum layer must be sufficiently thick that the VLT of the laminate is reduced to 20%.

DETAILED DESCRIPTION OF PREFERRED EMBODIMENTS OF THE INVENTION

The following is a detailed description of several embodiments of the invention that are presently deemed by the inventors to be the best mode of carrying out their invention. In particular, FIGS. 2 to 8 illustrate presently preferred embodiments of the invention which are effective to provide solar control films having (1) significantly reduced emissivity, (2) significantly increased VLT, and (3) significantly increased UV, wear and scratch resistance as compared with the commercial film illustrated in FIG. 1. The structure of each of the illustrated embodiments will be described first, followed by a description of the materials of construction that result in substantially decreased emissivity, substantially increased transmissivity, and substantially increased wear and scratch resistance.

Figure 2:
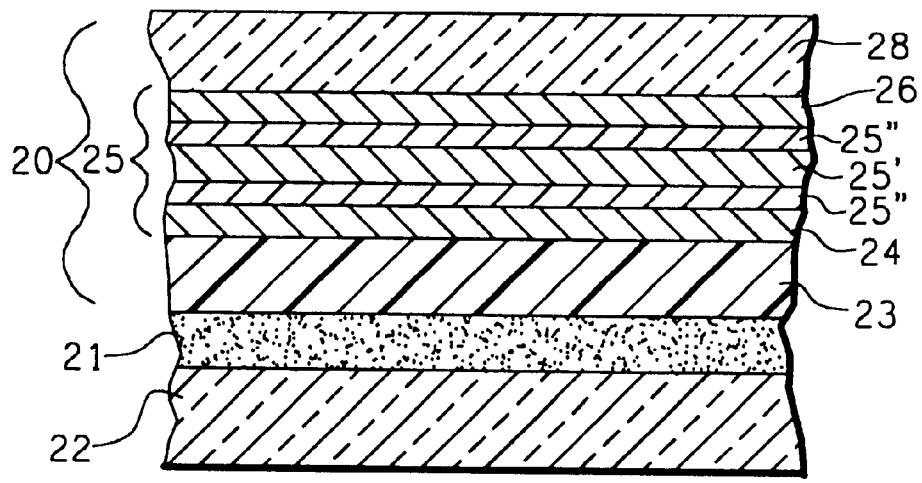
FIGS. 2 to 8 are, respectively, schematic illustrations, also on a greatly magnified scale, of seven different and presently preferred embodiments of the low e window film of the invention.

A first and preferred embodiment of the low emissivity solar control film of the invention is illustrated schematically in FIG. 2 as comprising a multilayer film 20 adapted to be adhered by pressure sensitive adhesive 21 to a window 22. The adhesive 21 preferably contains sufficient UV absorptive materials to block transmission of 99% of the UV radiation.

The solar control film 20 is comprised of a flexible, transparent, polymeric substrate 23, preferably Poly (ethylene terephthalate) (PET) or Poly(ethylene naphthalene) (PEN), bearing a transparent, thin film layer 24 of performance enhancing material, preferably a material of high optical index, deposited on the substrate, a semitransparent multilayer stack 25 of metal deposited on the layer 24, a second layer 26 of performance enhancing material, preferably a material of high optical index, deposited on the metal stack 25, and, optionally but preferably, a transparent layer 28 of hard coat material deposited over the layer 26 for imparting scratch, wear and weathering resistance to the external or exposed surface of the composite film.

The layers 24 and 26 of material of high optical index, i.e., high refractive index, induce and significantly enhance the visible light transmission of the composite structure without causing material change in the low emissivity of the structure.

The metal stack 25 is preferably comprised of a thin film layer 25' of a metal that is highly reflective in the infrared range and that is sandwiched between two extremely thin film layers 25" of a metal which is highly resistant to oxidation and chemical corrosion and which prohibits deterioration of the reflective metal layer 25'.

The resultant solar control film is easy to manufacture and provides excellent performance, stability and longevity.

Figure 3:
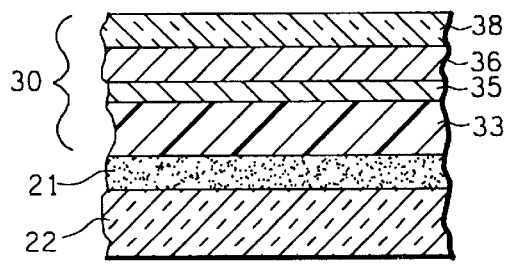

Another embodiment of the low emissivity solar control film of the invention is illustrated schematically at 30 in FIG. 3. The film 30 is comprised of a flexible, transparent, polymeric substrate 33, preferably PET or PEN, bearing a transparent, thin film layer 35 of highly reflective metal, a transparent, thin film layer 36 of material for enhancing the performance of and/or protecting the metal layer from damage and corrosion, and, optionally but preferably, a transparent layer 38 of hard coat material for imparting scratch, wear and weathering resistance to the external or exposed surface of the composite film.

Figure 4:
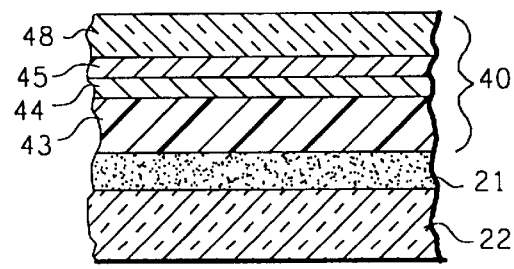

In FIG. 4, a solar control film 40 is illustrated schematically as being comprised of a flexible, transparent, polymeric substrate 43, a transparent, thin film layer 44 of material for enhancing the performance and/or protecting the metal layer from damage and corrosion deposited on the substrate, a transparent, thin film layer 45 of highly reflective metal deposited on the layer 44, and a transparent layer 48 of hard coat material deposited on the metal layer 45 for imparting scratch, wear and weathering resistant to the external or exposed surface of the composite film.

Figure 5:
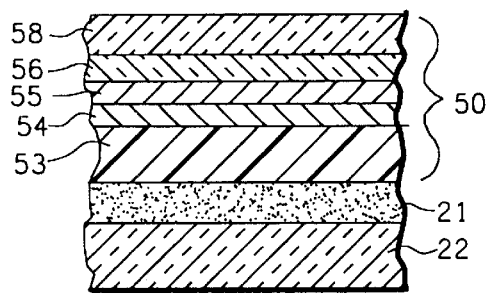
Figure 6:
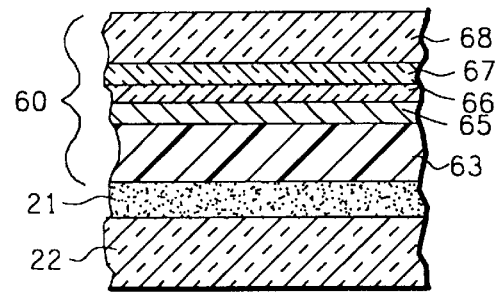

FIG. 5 illustrates schematically a solar film 50 comprised of a flexible, transparent substrate 53 bearing a first transparent layer 54 of performance enhancing material, a thin film transparent layer 55 of reflective metal, a second transparent layer 56 of performance enhancing and/or metal protective material, and an outer or exposed layer 58 of protective hard coat material In FIG. 6, a solar control film 60 is shown as being comprised of a flexible, transparent polymeric substrate 63 bearing a thin film layer 65 of reflective metal, a thin film layer 66 of performance enhancing material deposited on the reflective metal layer 65, a thin film layer 67 of protective material deposited on the layer 66, and a top or outer layer 68 of protective hard coat material.

Figure 7:
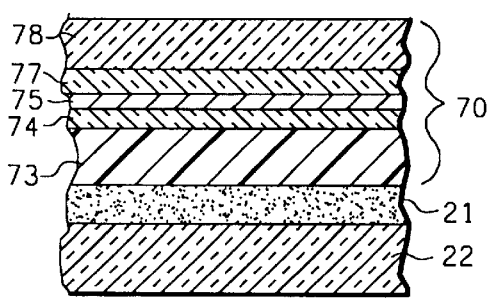

In the embodiment of FIG. 7, a low e film 70 is comprised of a flexible, transparent polymeric substrate 73 bearing a thin film layer 74 of material having a high optical index, i.e., a high refractive index, a thin film 75 of reflective metal deposited on the layer 74, a layer 77 of metal protecting material on the layer 75, and an outer or exposed layer 78 of hard coat material.

Figure 8:
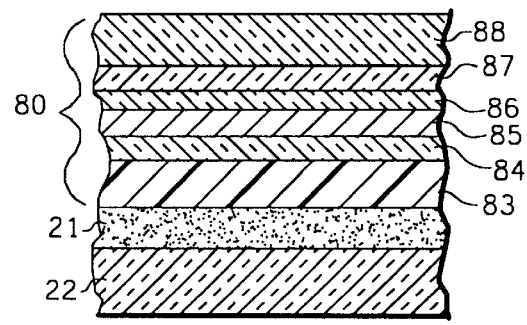

The embodiment of the invention illustrated at 80 in FIG. 8 is comprised of a flexible, transparent polymeric substrate 83 bearing a first layer 84 of performance enhancing material, a layer 85 of reflective metal deposited on the layer 84, a second layer 86 of performance enhancing material deposited on the layer 85, and a pair of protective layers 87 and 88.

In all of the embodiments, the transparent substrate is preferably a 1.0 to 2.0 mil thick flexible web of Poly(ethylene terephthalate) (PET) or Poly(ethylene naphthalene) (PEN), as customarily used in the solar film industry.

The reflective metal layers 25 (25'), 35, 45, 55, 65, 75, 85 may be comprised of any metal that is highly reflective in the infrared range, such as gold, silver, copper and aluminum, as well as their alloys and composites.

The thickness of the reflective metal layer will be determined by the following factors: The metal or metals employed, the emissivity desired or selected, and the VLT desired or selected, which will in turn determine the requirements for the remainder of the structure and the thickness of the layer or layers of performance enhancing materials, if any. Generally, since production costs will set the economic limits on the complexity of the structure, heavy reliance should not be placed on the use of materials of high refractive index for induced transparency. As a result, in order to provide a composite film having an emissivity of 0.30 or less and a VLT of at least 50%, the thickness of the metal layer should fall within the following ranges: Silver, 10–20 nm (nanometers), gold, 10–20 nm, copper, 20–50 nm; aluminum 3–8 nm. At these thicknesses, the reflective metal layer will have an emissivity in the order of about 0.10 or less and a VLT of about 50% or more.

In the case where a very thin film of metal (e.g., 25" in FIG. 2) is used to protect the reflective metal layer (25' in FIG. 2), the thin film material may be chosen from titanium, nickel, chromium, niobium, gold, platinum, their alloys such as Inconel, and stainless steel. The thin film thickness is in the range of about 0.5 to about 2.0 nanometers (nm), preferably 0.7 –1.4 nm.

As will be apparent to those skilled in the art, the IR reflective component in all of the embodiments of the invention may be comprised of either a single layer of reflective metal or a multilayer stack.

The performance enhancing materials that may be employed for the layers 24, 26, 36, 44, 54, 56, 66, 74, 84 and 86 include nitrides and oxides having a high optical index, e.g., an optical refractive index of 2.0 or higher and a coefficient of extinction of about 0.025 in the visible range, and having no major absorption in the 8 –12 micron range band. Depositing such performance enhancing layer on one or both sides of the reflective metal film or metal film stack will induce the transmission of light through the film. Specifically, such layer will reduce the visible light reflection (VLR) and increase the visible light transmission (VLT) of the composite film without increasing emissivity.

Suitable materials of high refractive index include oxides and/or synthetic oxides of tin, titanium, niobium, bismuth and zinc, indium tin oxide, and silicon nitride. Silicon nitride is doubly effective in that it also protects the reflective metal from oxidation and corrosion. For example, the use of silicon nitride for the layers 24 and 26 in FIG. 2, the layer 36 in FIG. 3, the layer 44 is FIG. 4, and the layers 54 and 56 in FIG. 5 will provide a high level of protection for a silver or silver alloy layer at 25, 35, 45 or 55 and at the same time enhance the VLT of the film without increasing e. Weatherability of the silver layer is thereby assured. The resultant solar film will have low e, high VLT and a long service life.

Generally, the thickness of a high refractive index layer deposited in accordance with the invention should be designed for maximum induced transmission in the visible spectrum, e.g., an optical thickness in the range of 80 –150 nm, depending on the material and thickness of the reflective metal layer.

The protective materials employed in the structure can be a single layer or a twin layer. If the performance enhancing layer is made of silicon nitride or silicon oxide-nitride, the protective layer is made of silicon oxide; otherwise, an organic coating is employed. A preferred choice is Parylene (poly-p-xylene), including Parylene C, Parylene D and Parylene N. Parylene is chemically stable, highly moisture resistant, oxidation resistant, and corrosion resistant, and quite transparent in the visible range, with its major absorption outside of the visible range and away from 10 microns. Parylene monomer vapor is extremely active and has superior crevice penetration and coating power. The Parylene vapor condenses and is polymerized on the cooled substrate surface, providing complete encapsulation of the metal free from pinholes. These polymer are ideally suited for coating metalized films in the same vacuum chamber as and immediately subsequent to metalizing of the film.

Alternatively, other polymeric films having their main absorption peak outside of the 7 –14 micron range, more essentially outside of the 8 –12 micron range, can either be vapor deposited, as taught in U.S. Pat.Nos. 4,842,893, 5,464,710 and 5,614,259, or roll coated, using conventional roll coaters. One example is to apply a 1 micron thick primer coat with a commercial roll coater. The primer is comprised mainly of a low molecular weight polyester which provides pinhole-free encapsulation and acts as a chemical barrier for the underlying layers. A thin layer of hard coating of 1 to 3 microns thickness is then coated over the outside to protect against mechanical damage, such as scratches.

The hard coat material employed customarily comprises an acrylate, especially a highly cross linked acrylate or methacrylate, providing an exterior or exposed surface having high mechanical strength, chemical resistance, heat resistance, and scratch and wear resistance. Such acrylates can be deposited to very precise thicknesses by application of the same, preferably under vacuum, to the underlying layer in the form of a monomer followed by polymerization under ultraviolet (UV) or electron beam (EB) radiation. Although the commercially available hard coating materials are acrylate based organics, with strong absorption in the infrared range, if the coating thickness is well controlled, the combined absorption is not excessive.

Figure 9:
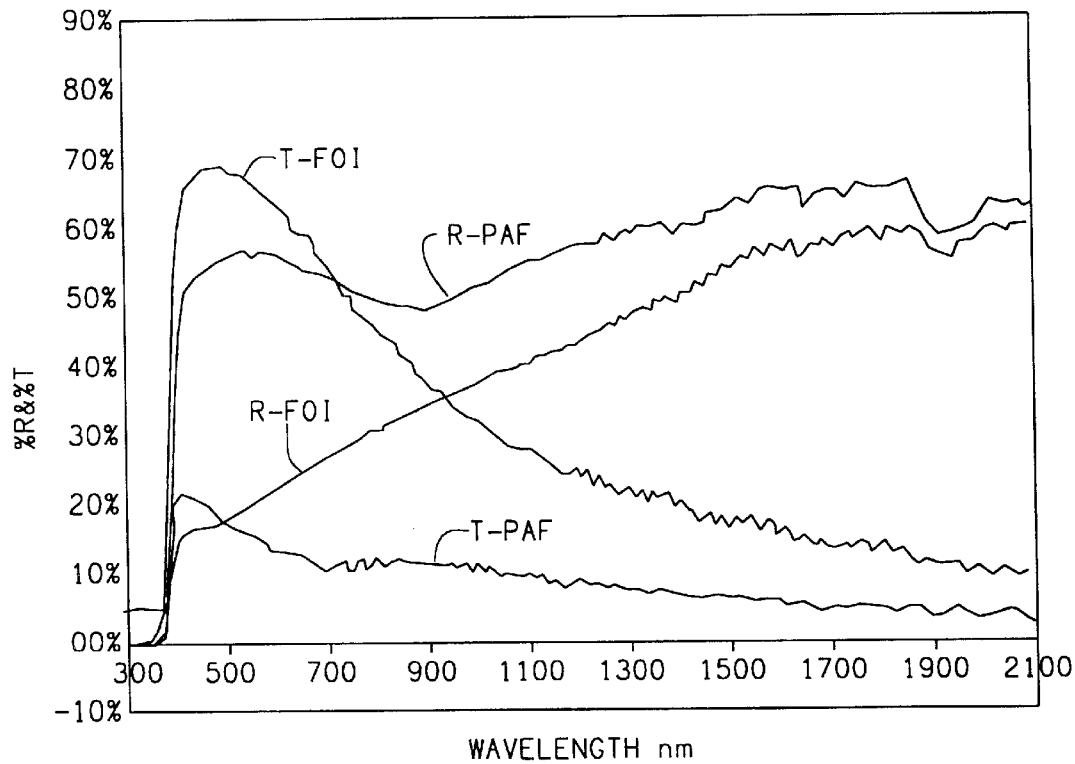
FIG. 9 is a graph comparing the visible light transmission and visible light reflection properties of the prior art low e film and a film made in accordance with the invention over the full spectrum of UV radiation to far IR radiation.
Figure 10:
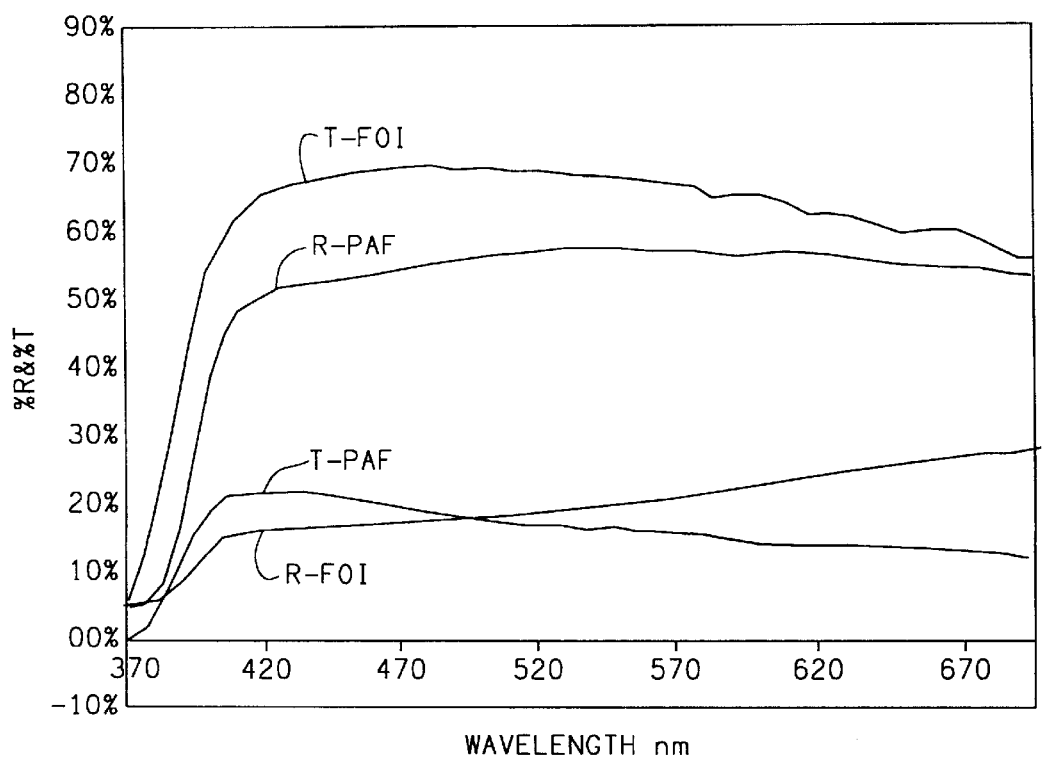
FIG. 10 is a graph comparing the visible light transmission and visible light reflection properties of the prior art low e film and a film made in accordance with the invention over the spectrum of visible light, i.e., from approximately 400 nanometers (nm) to approximately 700 nanometers (nm).

The embodiments of the invention illustrated in FIGS. 2–8 are each capable of providing an emissivity as low as or significantly lower than the emissivity of the prior art device of FIG. 1 and a visible light transmission that is substantially greater than that of the device of FIG. 1. FIGS. 9 and 10 graphically compare the visible light transmission (VLT) and visible light reflection (VLR) of the prior art film ("PAF") having an e of about 0.35, with the VLT and VLR of a film of the invention ("FOI") constructed as in FIG. 5 and having an e of about 0.30. FIG. 9 compares the films over the full spectrum from UV radiation to IR radiation and FIG. 10 compares the two films over the visible spectrum of from about 400 nm to about 700 nm. As graphically illustrated, the transmissivity of the film of the invention (T-FOI) greatly exceeds the transmissivity of the prior art film (T-PAF). Also, the reflectivity of the film of the invention (R-FOI) is significantly less than the reflectivity of the prior art film (R-PAF). In the visible spectrum (FIG. 10), the VLT of the prior art film (T-PAF) varies from a maximum of about 22% at 400 nm to a minimum of about 10% at 700 nm and, with a human's visual sensitivity as the weighing factor, producing a visible light transmission VLT of about 18%. In contrast, the film of the invention has a weighted VLT of about 67%. Also, the film of the invention has very low reflectivity (R-FOI) in the visible spectrum, resulting in much lower visible light reflection. Consequently, use of the film will not inflict upon neighbors, passersby or motorists irritating and unwelcome levels of reflectance.

In each of the illustrated embodiments, the solar control film of the invention is capable of providing a very low emissivity, e.g., 0.30 or less, visible light transmission that is significantly greater than the prior art 20%, e.g., up to 50% and more, high durability and weatherability, excellent scratch and wear resistance, and protection against ultraviolet radiation. The films also have a high level of efficiency for solar energy rejection and thereby provide low shading coefficients (SC).

The objects and advantages of the invention have therefore been shown to be achieved in a practical, economical and facile manner.

While preferred embodiments of the invention have been herein illustrated and described, it is to be appreciated that various changes, rearrangements and modifications may be made therein without departing from the scope of the invention as defined by the appended claims.

What is claimed is:

1. A solar control film having low emissivity and high visible light transmission comprising:
   a flexible transparent substrate bearing on one surface thereof
   a thin film layer of reflective metal,
   a thin film layer of protective material having its major absorption outside the visible range and away from 10 microns covering the layer of metal, and
   a thin film layer of scratch and wear resistant hard coat material covering the layer of protective material,
   said film being devoid of laminations and laminating adhesive and having an emissivity of about 0.30 or less and a visible light transmission of up to about 50% or more.

2. A solar control film as set forth in claim 1 wherein the layer of metal is comprised of silver, gold, copper or aluminum, or alloys thereof, or combinations thereof.

3. A solar control film as set forth in claim 1 wherein the layer of metal includes on at least one surface thereof a thin film of metal capable of protecting the reflective metal.

4. A solar control film as set forth in claim 3 wherein the thin film of metal capable of protecting the reflective metal comprises titanium, nickel, chromium, niobium, gold, platinum, their alloys, or stainless steel.

5. A solar control film as set forth in claim 1 wherein the layer of protective material comprises a polyester resin based material of low molecular weight having conformance, covering and bonding characteristics.

6. A solar control film as set forth in claim 1 wherein the layer of protective material comprises parylene.

7. A solar control film as set forth in claim 1 wherein the layer of protective material comprises silicon nitride.

8. A solar control film as set forth in claim 1 including a thin film layer of performance enhancing material on at least one side of the layer of reflective metal, the performance enhancing material having a high index of refraction and being effective to reduce the visible light reflectance and increase the visible light transmittance of the film.

9. A solar control film as set forth in claim 1 including a layer of adhesive on the other surface of the substrate containing ultraviolet absorptive materials.

10. A solar control film having low emissivity and high visible light transmission comprising
   a flexible transparent polymeric substrate bearing
   a thin film layer of reflective metal
   a thin film layer of protective material covering the metal layer and comprising a polyester resin based material of low molecular weight having its major absorption outside the visible range and outside the range of 8–12 microns, and
   a thin film layer of scratch and wear resistant hard coat material covering the layer of protective material,
   said film being devoid of laminations and laminating adhesive and having an emissivity of about 0.30 or less and a visible light transmission of up to about 50% or more.

11. A solar control film as set forth in claim 10 wherein the layer of metal includes on at least one surface thereof a thin film of material that bonds with oxygen.

12. A solar control film as set forth in claims 10 wherein the layer of reflective metal is comprised of silver or gold, or alloys thereof or combinations thereof.

13. A solar control film as set forth in claim 10 including a layer of adhesive for adhering the film to a window, said adhesive containing ultraviolet absorbers for absorbing the majority of ultraviolet radiation to which the film is exposed.

14. A solar control film as set forth in claim 10 including a thin film layer of performance enhancing material on at least one side of the layer of reflective metal, the performance enhancing material having a high index of refraction and being effective to reduce the visible light reflectance and increase the visible light transmittance of the film.

* * * * *